Feb. 19, 1957 A. W. VANCE 2,782,275

PLUGBOARD FOR COMPUTER PROGRAMMING SYSTEM

Filed Oct. 21, 1953 2 Sheets-Sheet 1

INVENTOR.
Arthur W. Vance
BY Morris A. Rabkin
ATTORNEY

Feb. 19, 1957 A. W. VANCE 2,782,275

PLUGBOARD FOR COMPUTER PROGRAMMING SYSTEM

Filed Oct. 21, 1953 2 Sheets-Sheet 2

INVENTOR.

Arthur W. Vance

BY Morris A. Rabkin

ATTORNEY

United States Patent Office 2,782,275

Patented Feb. 19, 1957

2,782,275

PLUGBOARD FOR COMPUTER PROGRAMMING SYSTEM

Arthur W. Vance, Cranbury, N. J., assignor to Radio Corporation of America, a corporation of Delaware Application October 21, 1953, Serial No. 387,496

10 Claims. (Cl. 200—46)

This invention relates to electronic computers, and particularly to a plugboard for programming a computer.

Large-scale electronic analogue computers used for the solution of complex mathematical problems may incorporate several hundred units of different types of equipment such as integrators, differentiators, amplifiers, electronic switches and recorders. In order to standardize equipment and reduce the number of different types, the computer machine may be built with identical basic units or building blocks such as amplifiers, from which the more complex computing circuits may be constructed. In this way, a given machine is able to handle a large variety of mathematical problems, and trouble-shooting and maintenance procedures can be standardized and simplified.

Setting up a computer machine of this kind to solve a particular problem involves connecting in circuit the necessary basic units and the specific impedances required by the constants of the problem. This preparation of a machine, called "programming," may entail making thousands of connections for a complex problem. Furthermore, the total number of possible connections in a large machine may be of the order of one hundred thousand.

Because of the multitude of connections and the extreme care required to avoid errors, a time period of a few days to program the machine is not unusual. Large-scale computers are extremely expensive, and there is great demand for their use for problems otherwise impossible to solve. Consequently, operating time of a computer is valuable, and loss of machine time in programming is costly.

In certain systems, a plugboard with a cross-bar connecting system is employed. There are a series of vertical conductor bars in front portion of the plugboard that may be connected by contact pins to a series of horizontal conductors in the back. At each cross-over position of a vertical and horizontal conductor, there is a pair of contact pins, namely a front contact pin and a back contact pin. A connection is made by connecting the front pin to the back pin. To each horizontal conductor, there is connected a terminal of a unit of equipment such as an amplifier. Selecting one such unit, horizontal conductor is connected to a vertical conductor by a pair of contact pins. The vertical conductor may then be connected by one or more pairs of contact pins to any one or a combination of impedances of different types and assorted values. Individual conductors may be used to connect one terminal of each impedance to a back contact pin. The other terminals of the impedances associated with any one vertical bar are connected in parallel to another vertical conductor. The last mentioned vertical conductor, in turn, may be connected to another horizontal conductor by contact pins, and, thereby, to another or the same amplifier or to another type of unit. With this arrangement and procedure, integrators, differentiators and the like may be built up from the amplifiers and impedances, and connected together to assemble more complex circuits. By means of a number of such plugboards, different sections of the computer are assembled and connected together to set up the complete apparatus for the particular problem to be solved.

In order to provide a somewhat automatic system for connecting the pairs of pins where desired, punch cards are employed. The cards are positioned between the pairs of pins, so that where there is a hole in the punch card the pins are connected, and where the card is left unpunched the pins are retained out of contact. The punch card thus provides a permanent record of the program for a particular problem.

It is an object of this invention to provide a new and improved system for setting up a computing machine quickly and reliably.

Another object of this invention is to provide a new and improved plugboard system for programming a computer whereby set-up time is reduced to a minimum.

Yet another object of this invention is to provide a new and improved plugboard system for a computer that permits connections to be readily changed.

Still another object of this invention is to provide a new and improved plugboard system whereby connections may be quickly made, readily checked and changes easily made.

An important feature of this invention is the incorporation of means for readily changing the connections and the program in the punch card without removing the punch card from the plugboard.

Each of the plugboards in an embodiment of the invention is made up of two aluminum blocks or contact-pin frame, one fixed and in back, and the other movable and in front. A plurality of matching holes are bored in the blocks in an arrangement of rows and columns. A fixed contact pin assembly is secured within each hole in the fixed block and insulated therefrom. The fixed pins may be individually plugged into coaxial connectors that are connected to separate impedances; or the pins in the same rows may be wired together to form the horizontal conductors connected to the larger units of equipment. In each hole of the movable block, a metallic cylinder is secured, insulated from the block; and in each cylinder, a spring-biased contact pin is slidably mounted. The cylinders in the same columns are connected together by metallic connecting strips to form the vertical conductor bars.

The fixed and movable blocks are mounted so that the holes are aligned and match, and each of the movable contact pins may be moved into contact with the fixed pin to which it is paired. One of the blocks is provided with an indexing arrangement for positioning a punch card between the two blocks with the holes in the card in proper alignment with holes in the blocks. The movable block is clamped against the fixed block with the punch card in between. The spring-biased pins move through the holes in the punch card into contact with the fixed pins where connections are to be made, and are retained out of contact by the unpunched portions of the card where no connection is desired.

An insulated cover plate is mounted on the front face of the movable block; and each of the movable contact pins has an insulated handle connected to it and extending beyond the cover plate. At the contact end of each movable pin, a card punching portion is provided. With this construction, changes in the program are readily accomplished without punching a new card. The pin connections can be changed by pushing a pin through an unpunched portion of the card to make an additional contact, and by pulling out a pin and inserting a paper tab or other separator between the handle and cover plate to retain the pin out of contact. Accordingly, correction of errors in the punch card and small modifications in the program are quickly accomplished.

The novel features of this invention as well as the invention itself both as to its organization and mode of operation may be best understood from the following description when read together with the accompanying drawings, in which.

Figure 1:
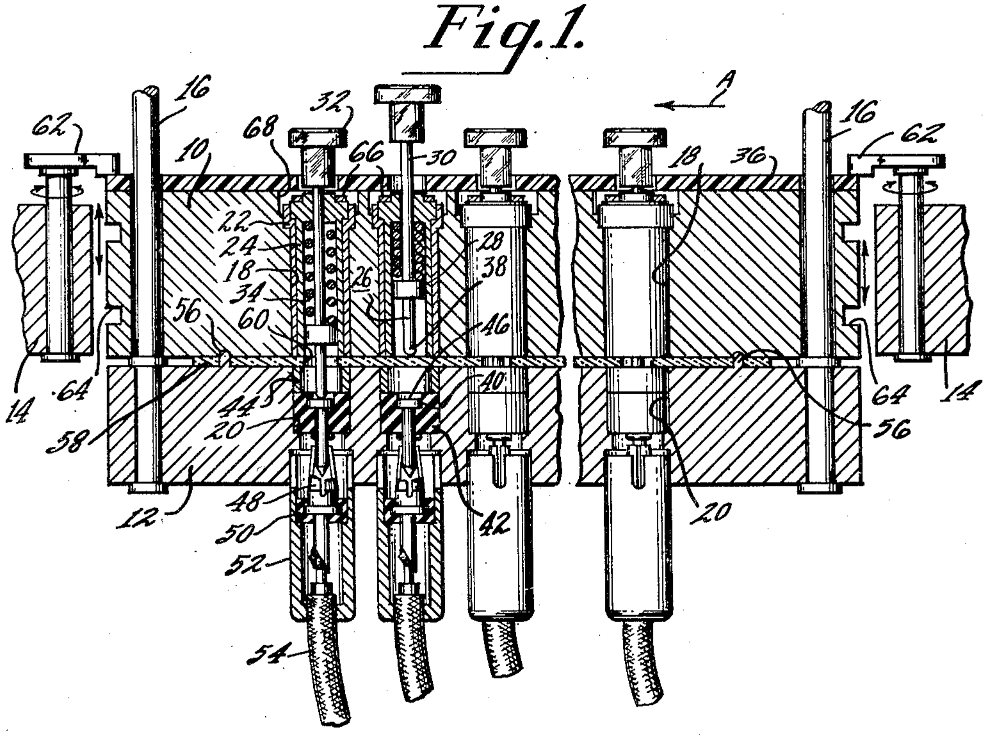
Figure 1 is a cross-sectional view of a portion of a plugboard embodying this invention.

Referring to Figure 1 of the drawing, a plugboard has two frame members 10, 12 in the form of blocks of aluminum adapted for mounting on an installation panel or support 14. The inner one 12 of the frame members is fixed to the panel 14 by appropriate brackets (not shown). A plurality of guide rods 16 are fixed to the inner block 12 and slidably support the outer block 10. Both blocks have a plurality of holes 18, 20 bored therethrough which are regularly arranged in rows and columns with the holes in the movable block 10 matching those in the fixed block 12. The guide rods 16 serve to align the holes in the movable block 10 with the holes in the fixed block 12.

Each of the holes 18 in the movable block 10 is counterbored at its outer end, and has a contact-pin assembly mounted within it. Each assembly is identical and includes an insulating bushing 22 fixed within one of the holes and enclosing a metallic cylindrical housing 24. A metallic contact pin 26 having an enlarged plunger portion 28 at its upper end (as viewed in the drawing) is slidably mounted in the cylindrical housing 24, with the plunger 28 in contact with the housing. Secured to the plunger end of the contact pin is an insulated shank portion 30, to which there is attached an insulated knob 32. The bottom of the knob 32 forms a shoulder with the shank 30 of the pin. A hole in the top of the housing 24 provides a passage for the pin shank. A metallic coil spring 34 encircles the pin shank 30, and is mounted between the upper portion of the cylindrical housing 24 and the upper surface of the plunger 28 for spring-biasing the pin downwardly. An insulated cover plate 36 with matching holes for the knobs 32 is attached to the upper face of the movable block 10. The lower end of the contact pin 26 has a rounded surface 38 adapted for making an electrical contact and also for punching holes in paper or cardboard.

In each of the holes 20 of the fixed block 12 there is a fixed contact-pin assembly. Each assembly is identical and includes a metallic contact pin 40 fixed in an insulating bushing 42. The bushing 42 is positioned in a counter bore in the upper end of each hole 20 and held in place by a press-fit spacer 44. The upper end of the fixed contact pin 40 has a flat electrical contact surface 46; and the lower end extends out of the insulating bushing 42, and is plugged into a spring-jaw connector collet 48. The connector collet 48 is fixed in an insulator bushing 50, which is, in turn, fixed to a metallic shield 52. The shield 52 is spring-jawed at its upper portion and press-fitted into a counter bore at the lower end of each hole 20. Coaxial cable 54 is passed through the shield 52 and soldered to a lower extension of the connector collet 48. The aluminum blocks 10, 12 provide an overall shield for the contact pin assemblies.

Formed on the upper surface of the fixed block 12 are a plurality of indexing pins 56 for positioning a punch card 58 with the holes 60 in the card in alignment with matching pairs of holes 18, 20 in the two blocks. Pivotally attached to the panel 14 at opposite ends of the movable block 10 are a plurality of camming levers 62 for engaging the upper surface of the cover plate 36 and clamping the two blocks together. Notches 64 in the ends of the movable block 10 are engageable by the ends of the camming levers for retaining the block in upraised position.

Figure 2:
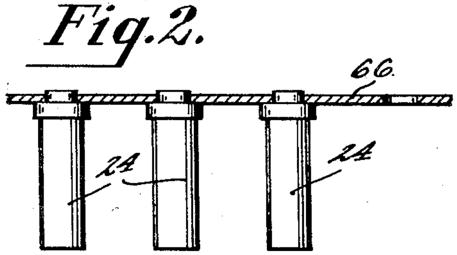
Figure 2 is a fragmentary view of a portion of the plugboard shown in Figure 1, looking in the direction of the arrow A in Figure 1.
Figures 5, 6:
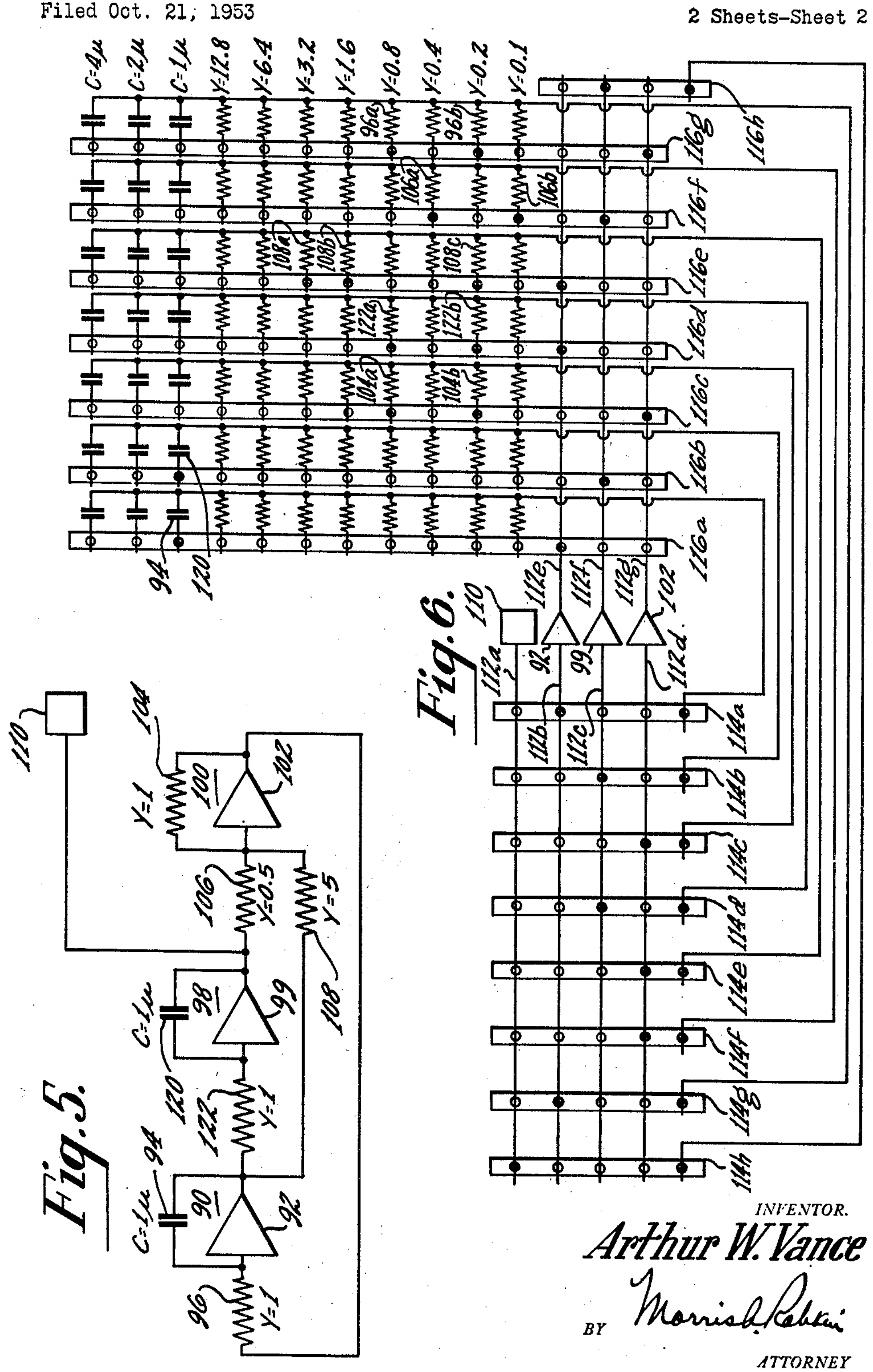
Figure 5 is a schematic block diagram of an electronic circuit for illustrating the application of an embodiment of this invention.
Figure 6 is a schematic diagram of a portion of a plugboard embodying this invention to illustrate the programming of the circuit shown in Figure 5.

The holes in both blocks 10, 12 are arranged in matching rows and columns. A portion of a row is shown in Figure 1 and a portion of column in Figure 3. All of the cylindrical housings 24 in each of the columns are electrically connected together by a separate metallic connecting strip 66. Reduced upper portions of the housings 24 are staked into holes in the connecting strip 66 as shown in Figure 2. These connecting strips 66 run in grooves 68 (Figure 3) formed in the upper face of the movable block and are centered by the insulating bushings 22 (Figure 1). The connecting strips 66 form vertical conductor bars (Figure 6). Separate horizontal conductors are formed by wiring together all of the fixed contact pins 40 in each row by suitable means (not shown).

Figure 3:
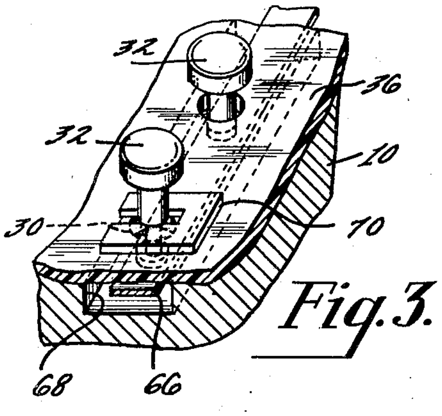
Figure 3 is a perspective view of a fragment of a plugboard embodying this invention.

The program for the computer is prepared by punching holes in a sheet of paper or cardboard 58 where connections are to be made. The movable block 10 is raised, and the punch card 58 is positioned on the indexing pins 56. The movable block is then lowered and clamped against the punch card 58 and the fixed block 12 by the camming levers 62. Where there are holes 60 in the punch card 58, spring-biased contact pins 26 are moved into contact with the fixed contact pins 40. Where there are no holes punched in the card 58, the spring-biased pins 26 are raised against the action of the springs 34 and held by the card material out of contact with the associated fixed pin 40. The program may be punched into the punch card 58 at any time without interfering with the operation of the computer. When the computer is available, the card is quickly inserted in the plugboard, and the connections made merely by clamping the movable block in position. Thus, loss of machine time for programming need be only a matter of minutes.

Where errors are made in the punch card, or where minor modifications of the program are desired, changes in the connections may be made quickly without removing the punch card from the plugboard. To make an additional connection the raised knob 32 on the desired contact pin 26 is manually depressed. The end 38 of the contact pin punches through the punch card and makes contact with the fixed pin. If it is desired to break a connection already made, the pin may be raised manually, and a U-shaped washer 70 inserted between the lower portion of the knob 32 and the cover plate 36, as shown in Figure 3. Thus, the movable contact pin is retained in raised position and separated from the fixed pin. The U-shaped washer 70 also functions as an indicating tab so that a record of the change in the program is provided. The punch card may be changed after the machine has run through a problem so that a permanent record of the corrected program is available for subsequent use.

Figure 4:
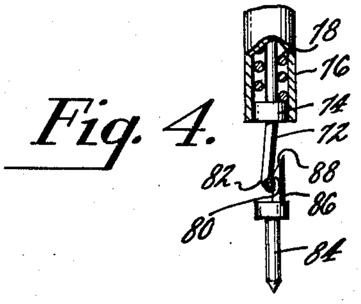
Figure 4 is a detailed view partly in section of a modification of this invention.

Shown in Figure 4 is a modified contact pin construction. The movable contact pin 72 has an enlarged plunger portion 74 in slidable contact with the metal housing 76 and is biased by a spring 78, as described above. The pin 72 is made of spring metal, and it has a contact surface 80 formed along the side and a paper-punching surface 82 at the end. The fixed contact pin 84 is provided with an axially offset metallic contact peg 86 having an inclined camming surface 88 at the upper end. When the movable contact pin 72 moves down and engages the inclined surface 88 on the peg 86, the pin 72 bends, and a spring-sliding contact is made. In this way, clean contact surfaces on the pins are maintained.

In Figure 5, there is shown a computer circuit which may be used to solve the differential equation $$\frac{d^2y}{dt^2}=5\frac{dy}{dt}+.5y$$

This circuit is shown to illustrate an application of the invention. In Figure 6, there is shown a schematic diagram of a portion of a plugboard system embodying this invention, that ilustrates the programming of the computer circuit with the specific component values shown in Figure 5. In the circuit of Figure 5, a first integrator 90 is made up of an amplifier 92, a capacitor 94 across the amplifier 92 and an input resistor 96. The first integrator 90 is connected to a second integrator 98 of the same type. The first and second integrators 90, 98 are connected to a summing amplifier 100 made up an amplifier 102, a resistor 104 across the amplifier 102 and two input resistors 106, 108. The output of the second integrator 98 is connected to a recorder 110.

In Figure 6 only the basic units of equipment needed for this circuit are shown; that is, the three amplifiers 92, 99, 102 and the recorder 110. Similarly, only the portions of the plugboard related to setting up the specific circuit are shown. Separate horizontal conductors 112*a* to *g* are connected to the input and output terminals of the amplifier 92, 99, 102 and to the input terminal of the recorder 110. A series of vertical conductor bars 114*a* to *h*, 116*a* to *h*, corresponding to the connecting strips 66, cross the horizontal conductors, and pairs of contact pins make connections at the cross-positions in the manner described above.

In one section of the plugboard, a series of eight vertical conductors 114*a* to *h* cross the horizontal conductors 112*a* to *d* connected to the inputs of the units of equipment. These are called return conductors. In a second section, a series of vertical conductors 116*a* to *h* cross the horizontal conductors 112*e* to *g* connected to the outputs of the equipment. Each of this second series of vertical conductors is also associated with a set of fixed contacts that are individually connected each respectively to one terminal of a group of resistors and capacitors of assorted values. These are called impedance conductors. The other terminals of each column of impedances are connected in parallel to a fixed contact pin associated with a different one of the return conductors.

In Figure 6, a pair of contact pins are shown to be in contact at a cross-position by a cross-hatched circle, and out of contact by a blank circle. A punch card for programming the circuit shown in Figure 5 has holes punched at the locations of the cross-hatched circles and no holes at the blank circles.

In setting up the first integrator 90, in Figure 5, the horizontal conductor 112*e* connected to the output terminal of a first amplifier 92 is connected by a pair of contact pins to a first impedance conductor, 116*a* which is connected, in turn, to a terminal of a capacitor 94 of value 1$\mu$. The other terminal of the capacitor 94 is connected to a first return conductor 114*a* which is connected, in turn, to the horizontal conductor 112*a* connected to the input terminal of the first amplifier 92. Similarly, a capacitor 120 of the same value is connected across the second amplifier 99 through a connection to a second impedance conductor 116*b* and connections to a second return conductor 114*b*. A conductance $Y=1$ is connected across a third amplifier 102 by a connection to a third impedance conductor 116*c*, which is connected, in turn, to resistors 104*a*, *b* of conductance values .2 and .8. The resistors 104*a*, *b* are connected in parallel to a third return conductor 114*c* which is connected to the input of the third amplifier 102. The output terminal of the first amplifier 92 is connected to a fourth impedance conductor 116*d* and, thereby, to a pair of resistors 122*a*, *b* in parallel. The resistors 122*a*, *b* are connected to a fourth return conductor 114*d*, and, thereby, to the horizontal conductor 112*c* connected to the input of the second amplifier 99. The first amplifier 92 is similarly connected to the input of the third amplifier 102 through conductances 108*a*, *b*, *c* of value $Y=5$ by means of a fifth impedance conductor 116*e* and a fifth return conductor 114*e*. The second amplifier 99 is connected to the third amplifier 102 through conductances 106*a*, *b* of value $Y=.5$ by means of sixth impedance and return conductors 116*f*, 114*f*. The third amplifier 102 is connected to the first amplifier 92 through conductances 104*a*, *b* of value $Y=1$ by means of seventh impedance and return conductors 116*g*. 114*g*. The output of the second amplifier 99 is connected by an eighth impedance conductor 116*h* (only a portion of which is shown) and by an eighth return conductor 114*h* to the input of the recorder 110.

It is evident from the above description of this invention, that a novel and improved system for setting up a computer quickly and reliably, has been provided. With a plugboard system of the invention the computer may be programmed by means of a punch card. Such programming may be done without interference with the operation of the computer. Furthermore, the set-up time of the computer itself may be reduced to a matter of minutes. Errors may be corrected and modifications made in the program quickly and easily without removing the punch card from the plugboard. A permanent record of the program may be provided, as well as a record of the changes made.

What is claimed is:

1. A programming plugboard for a computer comprising a plurality of first electrical contact devices each including an electrically-conductive contact element, a plurality of second electrical contact devices each including an electrically-conductive contact element operatively associated with the contact element of a different one of said first contact devices for completing an electrical circuit therewith, and means for supporting said first and second contact devices in operative relation to each other including means for positioning a punch card between said first and second contact devices to prevent engagement of certain associated ones of said contact elements and to permit engagement of the other associated contact elements in accordance with the program represented by holes through said punch card, each of the contact elements of said first contact devices being movable and manually operable and having a card punching portion for punching holes through said card to change said program.

2. A plugboard as recited in claim 1 wherein each of the contact elements of said first contact devices includes a metallic contact pin having a contact surface and said punching portion adjacent one end thereof, and each of said first contact devices further includes an insulated handle connected to the other end of said contact pin.

3. A plugboard comprising a plurality of first electrical contact devices each including a metallic contact element, a plurality of second electrical contact devices each including a metallic contact element operatively associated with the contact element of a different one of said first contact devices for completing an electrical circuit therewith, and means for supporting said first and second contact devices in operative relation to each other including means for positioning a punch card between said first and second contact devices to prevent engagement of certain associated ones of said contact elements, each of the contact elements of said first contact devices being movable and manually operable and having a card punching portion, each of the contact elements of said first contact devices including a metallic contact pin having a contact surface and said punching portion adjacent one end thereof, and each of said first contact devices further including an insulated handle connected to the other end of said contact pin, each of said contact pins being spring-biased for movement in the direction of the contact element of the associated one of said second contact devices for contact therewith, and each of said handles having a shoulder portion engageable for retaining said pin separated from the associated one of said second contact devices when there is a hole in the punch card portion therebetween.

4. A plugboard comprising a pair of supporting members each having a plurality of holes therein with the holes in one of said members arranged to match the holes in the other of said members, a separate electrically-conductive contact element fixedly mounted in each of the holes in said one member a predetermined distance removed from one side of said one member, a separate contact assembly mounted in each of the holes in said other member including a movable electrically-conductive contact pin, each of said movable contact pins being manually operable and having a card punching portion at one end thereof, means for biasing said movable pins outwardly of said holes at one side of said other member a distance greater than said predetermined distance, means for positioning said members adjacent each other with the holes in each in matching alignment and with said one sides of said members in facing relation, and indexing means for positioning a punch card between said members with each of the holes in said punch card in alignment with a pair of matching holes in said members.

5. A plugboard as recited in claim 4 wherein each of said contact assemblies includes separate means connected to each of said movable contact pins engageable for opposing said biasing means when there is a hole in the associated portion of the punch card.

6. A switchboard as recited in claim 5 wherein each of said separate engageable means includes an insulated handle connected to the other end of said movable contact pin, each of said handles extending out of the other side of said other member and having an engageable shoulder portion thereon.

7. A switchboard as recited in claim 4 wherein each of said fixed contact elements and each of said movable contact pins has a slidably engaging contact surface extending along a side thereof.

8. A programming plugboard for a computer comprising a pair of supporting blocks each having a plurality of holes therethrough with the holes in one of said blocks arranged to match the holes in the other of said blocks, a separate metallic contact element fixedly mounted in each of the holes in said one block a predetermined distance removed from one side of said one block, a separate metallic housing fixedly mounted in each of the holes in said other block, a separate metallic contact pin movably mounted within said housing and having a portion in sliding contact therewith, said movable contact pin having a card punching portion at one end there of, an insulated handle connected to the other end of said movable contact pin, said handle extending out of one side of said other block and having an engageable shoulder portion thereon, spring means for biasing said movable contact pins outwardly of said housings and the other side of said other block a distance greater than said predetermined distance, means for positioning said blocks adjacent each other with the holes in each in matching alignment and with said one side of said one block and said other side of said other block in facing relation, and indexing means for positioning a punch card between said blocks with each of the holes in said punch card in alignment with a pair of matching holes in said blocks.

9. A programming plugboard for a computer comprising a fixed metallic supporting block having a plurality of holes therethrough arranged in rows and columns, a movable metallic supporting block having a plurality of holes therethrough arranged in rows and columns to match the holes in said fixed block, a separate metallic contact pin fixedly mounted in each of the holes in said fixed block a predetermined distance removed from one side of said fixed block and insulated from said fixed block, means for connecting a separate conductor to each of said fixed contact pins, a separate metallic housing fixedly mounted in each of the holes in said movable block and insulated therefrom, a separate metallic connecting strip attached to all of said housings in the same column, a separate metallic contact pin having an enlarged plunger portion movably mounted within each of said housings in sliding contact therewith, said movable contact pin having a card punching portion at one end thereof, an insulated handle connected to the other end of said movable contact pin, said handle having an engageable shoulder portion thereon and extending out of one side of said movable block, spring means mounted between said housing and said plunger portion for biasing said movable contact pin outwardly of said housing and the other side of said movable block a distance greater than said predetermined distance, means for positioning said movable block adjacent said fixed block with the holes in each in matching alignment and with said one side of said fixed block and said other side of said movable block in facing relation, and indexing means for positioning a punch card between said fixed and movable blocks with each of the holes in said punch card in alignment with a pair of matching holes in said fixed and movable blocks.

10. A programming plugboard for a computer as recited in claim 9 wherein each of said fixed and slidable contact pins has a slidably engaging contact surface extending along a side thereof.

References Cited in the file of this patent

UNITED STATES PATENTS

| | | |
|---|---|---|
| 2,161,598 | Torkelson | June 6, 1939 |
| 2,197,306 | Ingraham | Apr. 16, 1940 |
| 2,453,239 | Luhn | Nov. 9, 1948 |